United States Patent Office 3,439,388
Patented Apr. 22, 1969

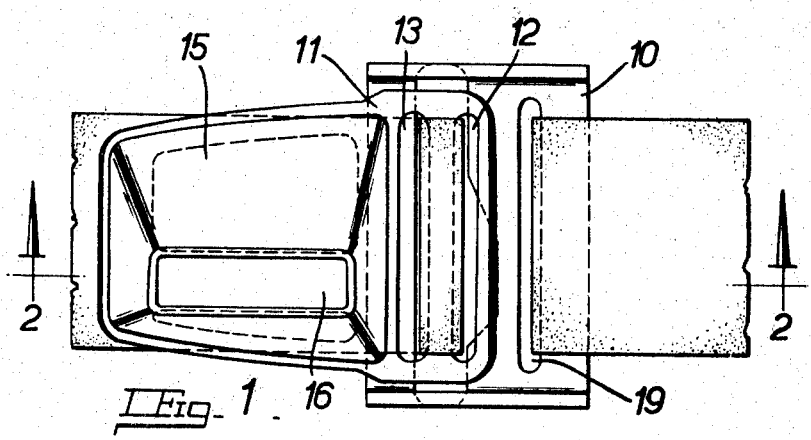
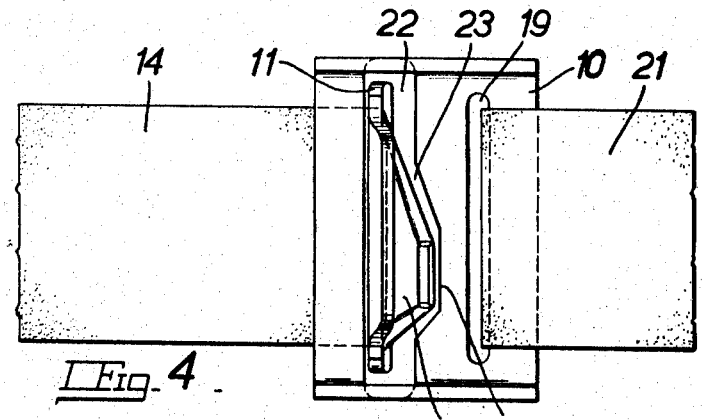
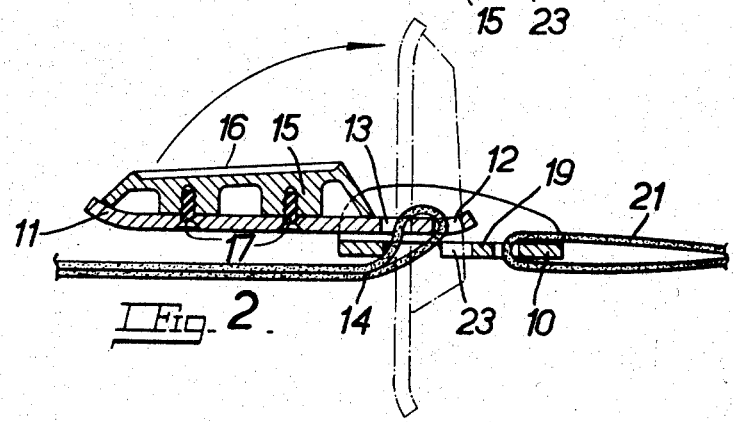

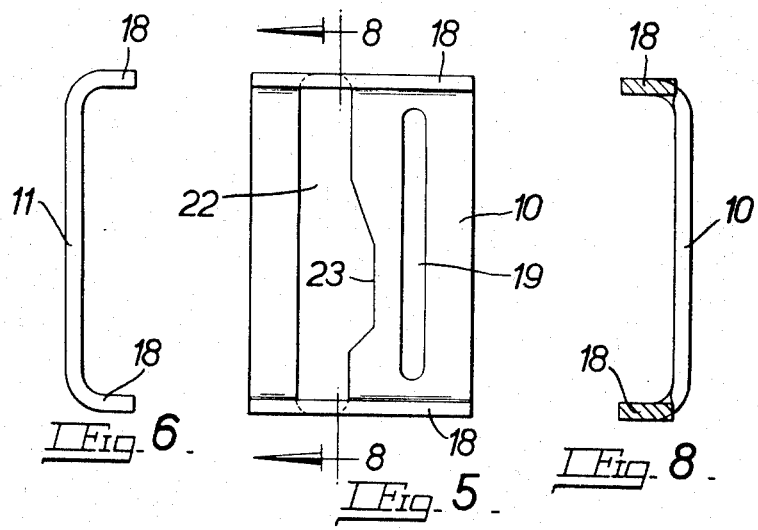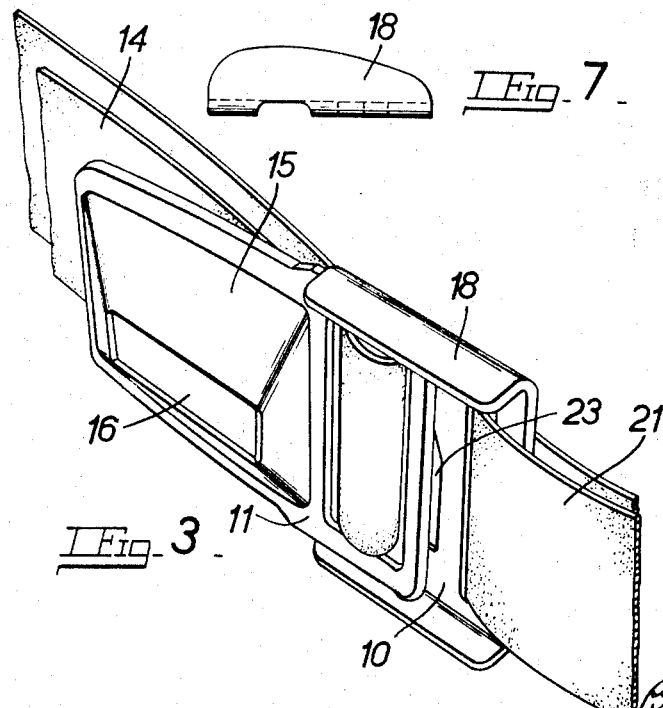

3,439,388
BUCKLES FOR SAFETY STRAPS AND HARNESSES
Thomas V. Barlow, Chichester, England, assignor to Wingard Limited, Sussex, England, a British company
Filed May 26, 1967, Ser. No. 641,672
Claims priority, application Great Britain, June 22, 1966, 27,794/66
Int. Cl. A44b *11/18, 11/25*
U.S. Cl. 24—197                  4 Claims

ABSTRACT OF THE DISCLOSURE

In a readily releasable buckle for a safety belt or harness of the kind in which a tongue is passed through an opening in a frame an asymmetric or transversely offset hump or projection is provided on one face of the tongue and the opening in the frame is of such an outline that the tongue can be passed through the frame only when it is correctly oriented with respect to the frame and only in one direction.

---

This invention relates to buckles for releasably joining together the ends of straps, in particular straps forming parts of safety belts or harnesses for the occupants of vehicles. One known type of buckle for vehicle safety belts comprises two co-operating members, one being basically a frame of roughly rectangular shape provided with means for attaching a belt end to it and provided with a basically rectangular aperture to receive the other member, which we will call the tongue member, which is attached to the other belt end and which passes through the aperture in the frame member and is then turned over to lie flat against that face of the frame member remote from the face from which the tongue first enters.

Such buckles have the advantage of involving no spring-loaded or other members potentially capable of failing and they are of simple and robust construction comprising simply the two members. The locking action is achieved by the co-operation of the mating surfaces of the frame member and the tongue member so that the greater the pull on the belt the greater is the force with which the belt is gripped between a bar, over which it passes, on the tongue member and the edge of the aperture in the frame member.

One drawback of some previous constructions of this kind of buckle has been that it has been possible for the user to insert the tongue member through the aperture in the frame member in a back-to-front condition and still to turn it over against the other face of the frame member so as to make a connection which might appear to the user to be satisfactory but which would come apart under tension. Another drawback of some known buckles is that it is possible for the user to inadvertently insert the tongue member from the wrong face of the frame member, for example, if there is half a turn of twist in that belt end which carries the frame member. Again this could result in an unsatisfactory connection.

Proposals have been made for overcoming both of these drawbacks, the first being overcome by the provision of shoulders of unequal height on the lateral edges of the tongue member and gaps of unequal width to receive them on opposite sides of the main aperture in the frame member. Another proposal for overcoming this drawback has involved the provision of projections on the underside of the lateral edges of the tongue member and by giving the aperture in the frame member a stepped shape comprising a wider portion and a narrower portion. The second drawback has been overcome by making the frame member symmetrical about its central plane so that an equally good connection is made regardless of whether the tongue member is inserted from one face of the frame member or from the other.

The aim of the invention is to provide a simple and effective construction of buckle of the class described above, which simultaneously overcomes both the drawbacks mentioned above.

According to the invention we now propose to provide an asymmetric or transversely offset hump, projection or like raised portion on one face of the tongue member at a position between its two lateral edges and to provide a correspondingly shaped recess in that one of the two longer edges of the aperture and the frame member adjacent to which this raised portion passes when the tongue member is inserted through the aperture in the correct attitude.

Preferably the raised portion is provided on the upper surface of the tongue member and therefore the recess is provided in that edge of the aperture in the frame member which is *not* the edge against which the belt associated with the tongue member bears when the buckle is under tension. This is clearly more satisfactory than providing the recess in that edge against which the belt bears under tension.

It will be appreciated that, with the hump present and of sufficient size, it will be impossible to insert the tongue member through the aperture in a back-to-front attitude because the hump will then foul the other edge of the aperture, i.e. that edge defined by the bar against which the belt bears in the assembled buckle. Similarly, if an attempt is made to insert the tongue member from the wrong face of the frame member this will again be prevented because, although the upper face of the tongue member will be adjacent to that edge of the aperture in the frame member which has the associated recess, the asymmetry of the positioning of the hump and recess in relation to a longitudinal centre line through the buckle will mean that the hump and recess do not coincide.

A preferred form of buckle in accordance with our invention is illustrated by way of example in the accompanying drawings in which:

FIGURE 1 is a front elevation of the buckle in the closed or engaged position;

FIGURE 2 is a longitudinal section of the buckle on the line 2—2 of FIGURE 1;

FIGURE 3 is a perspective view from the front of the buckle in the closed or engaged position;

FIGURE 4 is a front elevation showing the way in which the tongue is inserted into the frame;

FIGURE 5 is a front elevation of the frame by itself;

FIGURE 6 is an end view of the frame;

FIGURE 7 is a side view of the frame; and

FIGURE 8 is a section of the frame on the line 8—8 of FIGURE 5.

The buckle illustrated is intended as a fastening for straps forming parts of a safety belt or harness for an occupant of a vehicle.

The buckle comprises two parts, a frame 10, and a tongue 11, both formed as pressings or stampings from sheet steel of sufficient thickness to provide adequate strength and rigidity under the maximum loading to which the buckle is liable to be subjected.

The tongue has at one end two parallel slots 12, 13 through which is threaded a strap 14 forming part of the belt or harness. The tongue tapers off slightly in width towards the other end, and secured to the front face of the tongue is an asymmetrical hump 15 which forms the greater part of the front surface of the tongue.

The hump is of asymmetrical truncated rectangular pyramidal shape having an elongated flat top 16 over its area of maximum thickness which is offset to one side of the longitudinal centre line of the tongue. The open angle of the pyramid may be of the order of 160°.

The transverse cross-section of the hump may be uniform throughout its length but preferably the hump tapers off in thickness towards the end remote from the slots 12, 13 to facilitate the entry of the tongue into the frame as described below.

In the buckle illustrated the hump is a plastic moulding secured to the tongue by screws or rivets 17, but it may be of metal and could be an integral part of the tongue. Where the hump is a plastic moulding part of the metal of the tongue behind it may be punched out to reduce the weight of the tongue.

The surface of the top 16 may be recessed to receive a name tag or label.

The frame 10 is flat with upturned flanges 18 on its side edges spaced apart at a distance slightly greater than the maximum width of the tongue. Near one end there is a slot 19 to receive a strap 21, and near the other end there is a slot 22 to receive the tongue 11. The inner edge of this slot is cut away or recessed as shown in 23, the recess being offset from the longitudinal centre line of the frame and the form of the recess being such that the outline of the slot is the same as that of a cross-section of the tongue at its point of maximum thickness.

The dimensions of the slot 22 are slightly greater than the cross-section of the tongue to allow the tongue to be inserted freely through the slot when the tongue is correctly oriented with respect to the frame and is inserted from the rear side of the frame.

The correct method of inserting the tongue into the frame is shown in FIGURE 2, the tongue being inserted into the slot 22 from the back and the offsetting of the hump on the tongue mating with the offsetting of the recess on the inner edge of the slot.

After the tongue has been drawn completely through the slot in the buckle it is turned over into a locked position in which it lies parallel to and extends in a direction away from the frame as shown more particularly in FIGURES 2 and 3. In this position the inner end of the tongue lies between the upturned flange 18 on the frame which prevent relative displacement between the tongue and the frame in a transverse direction.

I claim:
1. A readily releasable buckle for a safety belt or harness comprising a frame member and a tongue adapted to be passed through an opening in the frame member, the frame member and the tongue having cooperating portions which prevent insertion of the tongue through the opening in the frame except when the frame and tongue are in correct relationship wherein the improvement consists in providing on one face of the tongue intermediate its side edges a single asymmetric or transversely offset hump or projection and in making the opening in the frame member of such an outline that the tongue can be passed through the opening only when the tongue is correctly oriented with respect to the frame and only in one direction.

2. A buckle as in claim 1 wherein the hump or projection is provided on the front face of the tongue and a recess complementary to the hump or projection is formed in the edge of the slot in whch the frame member opposite to the edge on which a strap attached to the tongue bears when the buckle is under tension.

3. A buckle as in claim 1 wherein the hump or projection is of truncated rectangular pyramidal form and its apex is transversely offset from the longitudinal centre line of the tongue.

4. A buckle as in claim 1 wherein the hump or projection is a plastic moulding secured to the tongue.

References Cited

UNITED STATES PATENTS

| 2,807,852 | 10/1957 | Rave | 24—197 |
| 3,060,537 | 10/1962 | Hatfield | 24—197 |
| 3,165,802 | 1/1965 | Irvin | 24—197 |
| 3,231,953 | 2/1966 | McHenry | 24—197 |

DONALD A. GRIFFIN, *Primary Examiner.*